US008150846B2

(12) United States Patent
Kohanim et al.

(10) Patent No.: US 8,150,846 B2
(45) Date of Patent: Apr. 3, 2012

(54) CONTENT SEARCHING AND CONFIGURATION OF SEARCH RESULTS

(75) Inventors: Greg A Kohanim, Issaquah, WA (US); Jonathan L Wiedemann, Seattle, WA (US); Christine A. Jefson, Seattle, WA (US); David Aaron Ward Snelling, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 84 days.

(21) Appl. No.: 11/060,205

(22) Filed: Feb. 17, 2005

(65) Prior Publication Data

US 2006/0184512 A1   Aug. 17, 2006

(51) Int. Cl.
*G06F 17/30*   (2006.01)

(52) U.S. Cl. .......... 707/734; 707/706; 707/722; 706/20; 706/45; 715/205

(58) Field of Classification Search ........................ None
See application file for complete search history.

(56) References Cited

U.S. PATENT DOCUMENTS

| | | | | |
|---|---|---|---|---|
| 5,717,914 A * | 2/1998 | Husick et al. | ...................... | 707/5 |
| 5,999,932 A * | 12/1999 | Paul | ............... | 707/10 |
| 6,029,195 A * | 2/2000 | Herz | ............................. | 725/116 |
| 6,073,130 A * | 6/2000 | Jacobson et al. | ................... | 707/5 |
| 6,138,113 A * | 10/2000 | Dean et al. | ......................... | 707/2 |
| 6,415,281 B1 * | 7/2002 | Anderson | ......................... | 707/3 |
| 6,526,440 B1 * | 2/2003 | Bharat | .......................... | 709/219 |
| 6,564,202 B1 * | 5/2003 | Schuetze et al. | .................... | 707/2 |
| 6,647,383 B1 * | 11/2003 | August et al. | .......................... | 1/1 |
| 6,671,681 B1 * | 12/2003 | Emens et al. | .................. | 707/706 |
| 6,708,162 B1 * | 3/2004 | Morgan et al. | ........................ | 1/1 |
| 6,859,799 B1 * | 2/2005 | Yuen | ................. | 707/3 |
| 6,961,731 B2 * | 11/2005 | Holbrook | ................................ | 1/1 |
| 7,028,024 B1 * | 4/2006 | Kommers et al. | ............. | 707/718 |
| 7,039,631 B1 * | 5/2006 | Finger, II | ........................... | 707/3 |
| 7,054,870 B2 * | 5/2006 | Holbrook | ............................... | 1/1 |
| 7,092,936 B1 * | 8/2006 | Alonso et al. | ................. | 707/737 |
| 7,181,438 B1 * | 2/2007 | Szabo | ................................ | 1/1 |
| 7,200,640 B1 * | 4/2007 | Cole et al. | ...................... | 709/217 |
| 7,287,025 B2 * | 10/2007 | Wen et al. | .............................. | 1/1 |
| 7,526,421 B2 * | 4/2009 | Deitch | ........................... | 703/21 |
| 7,685,209 B1 * | 3/2010 | Norton et al. | .................. | 707/803 |
| 7,698,344 B2 * | 4/2010 | Sareen et al. | ................. | 707/767 |
| 7,756,855 B2 * | 7/2010 | Ismalon | ........................ | 707/713 |
| 7,774,333 B2 * | 8/2010 | Colledge et al. | ............. | 707/708 |
| 7,801,899 B1 * | 9/2010 | Spitkovsky | ................... | 707/748 |
| 2004/0249808 A1 * | 12/2004 | Azzam et al. | ..................... | 707/4 |
| 2005/0080776 A1 * | 4/2005 | Colledge et al. | ................... | 707/3 |
| 2005/0222901 A1 * | 10/2005 | Agarwal et al. | ................. | 705/14 |
| 2006/0136382 A1 * | 6/2006 | Dettinger et al. | ................. | 707/3 |

OTHER PUBLICATIONS

Xu et al, "Query Expansion Using Local and Global Document Analysis", University of Massachusetts, 1996.*
Cui et al, "Probabilistic Query Expansion Using Query Logs", ACM, 2002.*
Cui et al, "Query Expansion by Mining User Logs", IEEE, vol. 15, No. 4, 2003.*
Wen et al, "Query Clustering Using User Logs", ACM 2002.*

(Continued)

*Primary Examiner* — Hung Le
(74) *Attorney, Agent, or Firm* — Lee & Hayes, PLLC (57) ABSTRACT

Content searching and configuration of search results are described. In an implementation, a method includes in response to a search query, selecting a keyword based on heuristic data which describes a plurality of previously performed searched. A search is performed utilizing the search query and the selected keyword to locate content.

4 Claims, 9 Drawing Sheets

OTHER PUBLICATIONS

Buckley et al, "Automatic Query Expansion Using SMART : TREC 3", Cornell University, 1995.*

Beeferman et al. "Agglomerative Clustering of a search engine query log", Lycos Inc, 2000.*

* cited by examiner

Search Result Page 502

Labrador Retriever

514 →
News

News Indepth: Political Pets ← 504

News Online takes a look at some other famous ... But it was the president's Labrador retriever Buddy who grabbed the spotlight ...
www.homespot.us/genapet/page13.php Dog News ← 506

... Dog News. dog news from around the world ... out for a walk when a truck with a Labrador retriever at the wheel passed by...." [CBC News] ...
dognews.blogspot.com/2004_09_12_dognews_archive.html 516 →
Rescue Labrador Retriever Rescue Contacts ← 508

... Before searching for a Labrador Retriever Rescue Group in your countries, you should know that some rescue ... rescue contact list of the Labrador Retriever Club for the location of ...
www.geocities.com/kwanyee_leung/rescue.html Labrador Retriever Rescue, Inc. - Rescued Dogs Make Great Pets ← 510

Labrador Retriever Rescue, Inc. is an all volunteer group whose purpose is to rescue, foster and place for adoption abandoned, neglected and unwanted Labrador Retrievers in the metro DC-MD-VA areas. ... With the Labrador Retriever being one of the most popular breeds, it ...
www.lrr.org Long Island Labrador Retriever Rescue, Inc. ← 512

... Long Island Labrador Retriever Rescue, Inc. ... The Night Before Christmas. Labrador Retriever Desk Calendar ...
www.lilrr.org

CONTENT SEARCHING AND CONFIGURATION OF SEARCH RESULTS

TECHNICAL FIELD

The present invention generally relates to content searching and more particularly relates to content searching and configuration of search results.

BACKGROUND

The amount of content which is available to a user is ever increasing. For example, a user may have access to a wide range of content which is available from over a network, such as web pages, downloadable songs, streaming video (e.g., video-on-demand), one or more results of remote application processing, and so on. For example, there are billions of web pages that are available to the user over the Internet which may provide a wide variety of information. Therefore, because of this wide variety of content, it may be difficult for a user to locate a particular content item of interest. Additionally, the user may have access to a wide variety of local content. For example, some computing devices, such as a desktop personal computer, have an amount of storage which is sufficient to store a wide variety of local content, such as pictures, documents, songs, video content, and so on. The amount of locally available content which may be stored may also make it difficult for the user to locate a particular local content item of interest.

For instance, a user of a computing device may interact with a search engine to locate particular content of interest, such as a web page. Search engines are typically provided via a dedicated web site which is accessible over the Internet to provide a user interface to help the user locate particular content of interest. However, because the amount of content is ever increasing, the amount of content which is located as a result of the search is also increasing. Therefore, a user may receive such a vast number of search results that the user is faced with a daunting task of navigating through the search results to find a particular search result that matches the original intent of the user.

Therefore, there is a continuing need for improved techniques for performing a search and configuring results of the search.

SUMMARY

Content searching and configuration of search results are described. In an implementation, a method includes in response to a search query, selecting a keyword. The selection is based on heuristic data which describes a plurality of previously performed searches. A search is performed utilizing the search query and the selected keyword to locate content.

In another implementation, a method includes performing a plurality of searches, in which, at least one of the searches includes a search query and a keyword added to the search query. A plurality of results of the plurality of searches is configured for concurrent display via a user interface (UI). The plurality of results are arranged for display via the UI in a plurality of groupings, at least one of which is formed from the results of the at least one of the searches.

In a further implementation, a method includes outputting a plurality of search results for concurrent display in a user interface (UI). The plurality of search results are obtained from a plurality of searches and arranged into a plurality of groups. When at least one of the groups displayed in the UI is selected, the UI is configured to display an additional search result which corresponds to the group that includes the at least one group.

BRIEF DESCRIPTION OF THE DRAWINGS

The same reference numbers are utilized in instances in the discussion to reference like structures and components.

DETAILED DESCRIPTION

Overview

Content searching and configuration of search results are described. Typical search results, such as search results obtained from an internet search engine, are presented in a list format. Each typical search result, for instance, is generally described using plain text and is arranged to form a directory. Such an arrangement is generally referred to as "vertical" in that the search results are arranged vertically in a user interface, one to another, based on processing performed by the internet search engine to determine a relevance of each search result to a search query. Navigation through the search results by a user typically involves scanning each search result for bolded keywords and selecting a particular result by "clicking" on an included link. As result of this selection, the user's internet browser is redirected to a content item referenced by the search result, such as a web page. If the referenced content item is not relevant to the user, the user is typically required to manually navigate back to the search page, select another search result, and then navigate to the content referenced by the other search result. This process may need to be repeated multiple times by the user until a particular content item of interest is located.

In an implementation, methods, systems, and apparatus are described which perform a plurality of searches in response to a single search query. For example, a search query for "Arnold Schwarzenegger" may be received. Based on the search query, a plurality of keywords may be located. The located keywords are then added to the search query to perform a search for content which corresponds to the search query and the added keywords. A variety of keyword types may be utilized, such as keywords which correspond to content categories, such as "politics", "music", "movies", and so on. Additionally, a keyword may be dynamically derived based on heuristic data, such as through examination of previous searches which correspond to the search query. For instance, examination of heuristic data for "Arnold Schwarzenegger" may be utilized to derive a keyword "bodybuilding". Thus, the heuristic data may be leveraged to further improve the search query based on previously performed searches.

The plurality of keywords may then be packaged with the search query to perform a plurality of searches, such as "Arnold Schwarzenegger politics", "Arnold Schwarzenegger movies", "Arnold Schwarzenegger bodybuilding", and so on. Results from each of these searches may then be grouped for display. Thus, results from the separate searches may be utilized to provide the categories without requiring additional post-processing of the search results. For example, results of "Arnold Schwarzenegger politics" may be grouped separately from results of "Arnold Schwarzenegger movies" in a UI. These groupings may therefore provide contextual categories for arrangement of the search results to aid the user in navigating to a particular content item of interest. Further discussion of addition and derivation of keywords may be found in relation to FIGS. 3 and 4.

In another implementation, methods, systems, and apparatus are described which configure results of a search for output based on a relative "richness" of a display format which may be utilized to display the search results. For example, search results which reference relatively "rich" content (e.g., photos, video, and so on) may be given a preference in relation to search results which have relatively "less rich" content (e.g., plaintext) when ordering the search results. For instance, a search result which contains a picture and article that is accessible may be displayed as a top story in a "news page" style format of a search results page. The rest of the page may be dynamically created to include other search results, such as the plaintext search results. Further discussion of configuring a plurality of search results based on display format of one or more of the search results may be found in relation to FIGS. 3, 7 and 8. In the following discussion, an exemplary environment is first described which is operable to employ search and display techniques. Exemplary procedures are then described which may be implemented in the exemplary environment, as well as other environments.

Exemplary Environment

Figure 1:
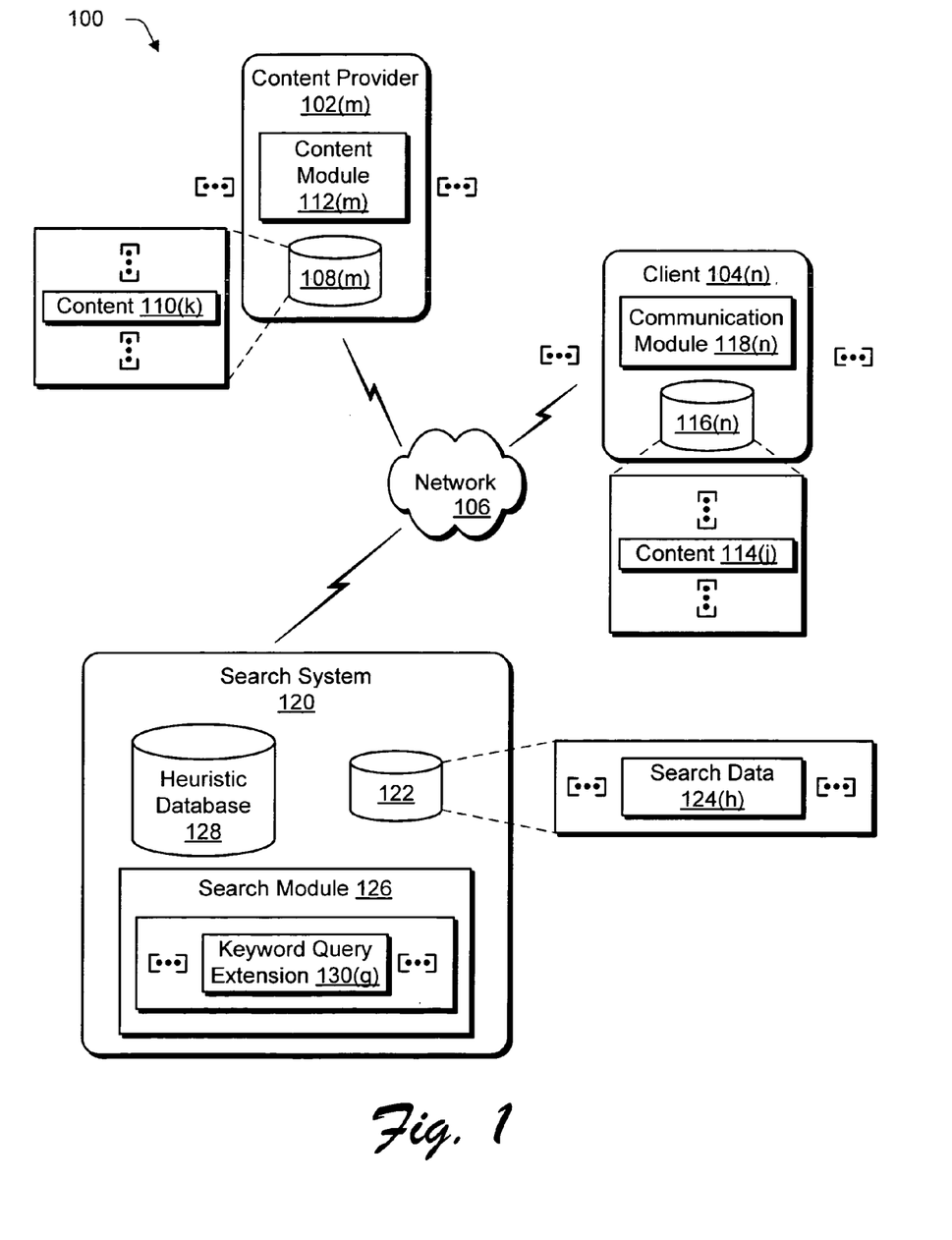
FIG. 1 is an illustration of an environment in an exemplary implementation that is operable to employ the search and configuration techniques.

FIG. 1 is an illustration of an environment 100 in an exemplary implementation that is operable to employ search and display techniques. The illustrated environment 100 includes a plurality of content providers 102(m) (where "m" can be any integer from one to "M") which are communicatively coupled to a plurality of clients 104(n) (where "n" can be any integer from one to "N") over a network 106. The clients 104(n) may be configured in a variety of ways. For example, the client 104(n) may be configured as a computing device that is capable of communicating over the network 106, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to a low-resource device with limited memory and/or processing resources (e.g., traditional set-top boxes, hand-held game consoles). The clients 104(n) may also relate to a person and/or entity that operate the clients. In other words, clients 104(n) may describe logical clients that include users and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks, such as a corporate intranet and the Internet. A wide variety of other instances are also contemplated.

The content provider 102(m) is illustrated as having storage 108(m) (e.g., a database) which is configured to maintain a plurality of content 110(k), where "k" can be any integer from one to "K". The plurality of content 110(k) is available for access over the network 106 and may be configured in a variety of ways. For example, the content 110(k) may be configured as a web page, an instant message, an email, audio content (e.g., a downloadable song), video content (e.g., a video-on-demand), a voice mail message, a meeting request, a software update, a result of remote application processing, and so on. To manage the content 110(k), the content provider 102(m) may execute a content module 112(m). The content module 112(m), for instance, may provide digital rights management of the content 110(k), process requests from the clients 104(n) for accessing the content 110(k), manage which content 110(k) is included in storage 108(m), communicate (e.g., stream) the content 110(k) over the network 106, and so on.

The client 104(n) is also illustrated as including a plurality of content 114(j), where "j" can be any integer from one to "J". This plurality of content 114(j) is illustrated as available from storage 116(n) which is local to the client 104(n). For example, the plurality of content 114(j) may include applications which are executable on the client 104(n), files, songs, video data, and so on.

The client 104(n) is further illustrated as including a communication module 118(n) which is executable to provide access to the content 110(k) which is available remotely over the network 106 and/or content 114(j) local to the client 104(n). For example, the communication module 118(n) may be configured as a web browser for execution on the client 104(n) to locate one or more of the plurality of content 110(k) from over the network 106. However, as previously described, each of the plurality of content providers 102(m) may provide a wide variety of content 110(k).

Accordingly, the client 104(n) may interact with a search system 120 to locate a particular content item. The search system 120 is illustrated as including storage 122 for a plurality of search data 124(h), where "h" can be any integer from one to "H". The search data 124(h) may be utilized as an index for locating content. For example, the search system 120 and search module 126 may be configured as an internet search engine. The search module 126, when executed, may search over the network 106 for content 110(k). The search module 126 may then generate and store search data 124(h) which described this search, such as where particular words, images, and so on where found over the network 106, characteristics of the content 110(k) itself, and so on. Therefore, when the search system 120 receives a request to locate a particular content item (e.g., content 110(k)) from the client 104(n), the search module 126 may be executed to locate search data 124(h) which describes the location (e.g., network address) of the content provider 102(m) which provides the particular content item. The search data 124(h) may incorporate a variety of factors for locating content, such as a number of times particular keywords are included in the content (e.g., a web page), a provider of the content, format of the content, and so on.

The search system 120 is also illustrated as including a heuristic database 128. The heuristic database 128 may be utilized to describe searches which were previously performed by the search system 120 and/or other search systems. For example, the heuristic database 128 may describe search queries which were previously received by the search system 120, results of the previous search queries (e.g., particular search results, number of search results, and so on), a series of search queries (e.g., search query "College Football" followed by search query "College Football Bowl Game"), search queries received from a particular client 104(n), and so on. The heuristic database 128 may be utilized in a wide variety of ways to provide additional functionality to the search system 120, and consequently clients 104(n) which interact with the search system 120.

The search module 126, for instance, may utilize one or more keyword query extensions 130(g), where "g" can be any integer from one to "G", for inclusion with a search query obtained from the client 104(n) to perform additional searches. The keyword query extensions 130(g) are designated as such in the following discussion to refer to additional one or more keywords which are utilized to "extend" a search query. For instance, the keyword query extension 130(g) may be added to one or more keywords which are included in the search query. Continuing with the previous example, the search module 126 may receive a search query which contains the keywords "college football" from the client 104(n). The search module 126 may then examine the heuristic database 128 to dynamically derive a keyword query extension 130(g), such as based on an observation that a relatively large percentage of searches performed by the search module 126 for "college football" also included the keywords "bowl game". One or more of the keyword query extensions 130(g) may also be preconfigured. For example, a search engine provider may also provide content, i.e., the provider may include the functionality of the search system 120 and one or more of the plurality of content providers 102(m). Therefore, the search system 120 may be configured to give preference to this content (e.g., by specifying a keyword which includes a domain of the one or more content providers 102(m)) to provide "richer" display formats in a search result, further discussion of which may be found in relation to FIG. 3.

The dynamically derived keyword query extensions (e.g., "bowl game") and the preconfigured keyword query extensions (e.g., "sports", "news", domain name, and so on) may be added to the search query "college football" to perform a plurality of searches. Search results obtained from the plurality of searches may then be grouped based on the search, and more particularly the keyword query extension 130(g) utilized to perform the respective search. Thus, the keyword query extensions 130(g) may be used to categorize search results without having to incorporate additional post-processing functionality at the search system 120 by leveraging functionality included by the search system 120 to locate content items and arrange search results. Further discussion of derivation of keyword query extensions 130(g) and multiple searches may be found beginning in relation to FIG. 3.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the search and configuration techniques described below are platform-independent, meaning that the techniques may be implemented on a variety of commercial computing platforms having a variety of processors.

Figure 2:
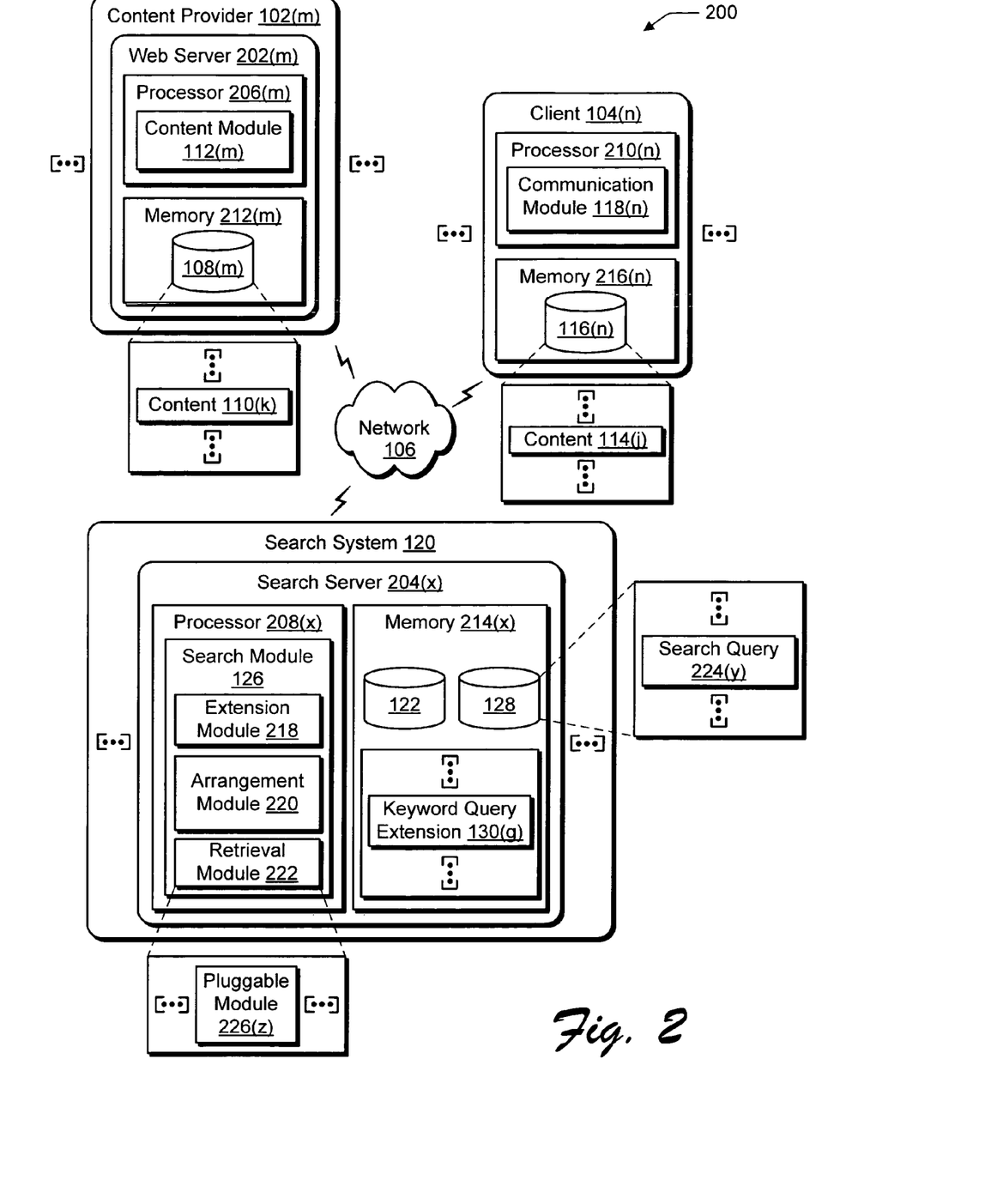
FIG. 2 is an illustration of a system in an exemplary implementation showing a content provider, client, and search system of FIG. 1 in greater detail.

FIG. 2 is an illustration of a system 200 in an exemplary implementation showing the content provider 102(m), the client 104(n), and the search system 120 of FIG. 1 in greater detail. The system 200 is an exemplary representation of the environment 100 of FIG. 1 as implemented through a variety of computing devices. For example, the plurality of content providers 102(m) is illustrated as being implemented by a corresponding plurality of web servers 202(m), although in another implementation a content provider 102(m) may be implemented by a plurality of servers. The search system 120 is illustrated as including a plurality of search servers 204(x), where "x" can be any integer from one to "X". The client 104(n) is illustrated as a client device. The web server 202(m), the search server 204(x), and the client 104(n) are each illustrated as including a respective processor 206(m), 208(x), 210(n) and a respective memory 212(m), 214(x), 216(n).

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 212(m), 214(x), 216(n) is shown, respectively, for the web server 202(m), search server 204(x), and client 104(n), a wide variety of types and combinations of memory may be employed, such as random access memory (RAM), hard disk memory, removable medium memory, and so forth. For example, storage for the search data 124(h) may be implemented by a RAID array, the heuristic database 128 may be implemented by a hard disk drive, and the plurality of keyword query extensions 130(g) may be stored in RAM.

The communication module 118(n) is illustrated as being executed on the processor 210(n) and is storable in memory 216(n) of the client 104(n). The communication module 118(n), when executed, may form a search query to locate one or more content items of interest. For example, the communication module 118(n) may be configured as a web browser for communication with the search module 126 over the network 106. The communication module 118(n), through interaction with the search module 126, may display a user interface (UI) for receiving an input from a user. Through interaction with the UI, the user may cause the search query to be communicated to the search module 126.

The search module 126 is illustrated as being executed on the processor 208(x) and is storable in memory 214(x) of the search server 204(x). The search module 126 is executable to provide a wide variety of functionality, examples of which are illustrated in FIG. 2 by an extension module 218, an arrangement module 220, and a retrieval module 222. The extension module 218 is executable to derive and select the plurality of keyword query extensions 130(g). For example, the extension module 218 may be executed to examine the heuristic database 128. The heuristic database 128 may describe a plurality of previous search queries 224(y), where "y" can be any integer from one to "Y", which was previously processed by the search module 126. In another implementation, the heuristic database 128 may describe a search performed by another search system.

The previous search queries 224(y) may be utilized by the extension module 218 to derive one or more keywords which may be added to a received search query. For instance, the extension module 218 may derive a keyword query extension 130(g) based on one or more keywords which were included in the previous search queries 224(y). The derivation of the keyword query extension 130(g) may be performed dynamically in response to the received search query, at periodical intervals, and so on. Additionally, the extension module 218 may be executed to select one or more keyword query extensions 130(g) which are preconfigured, such as keyword query extensions 130(g) which describe content categories, such as news, shopping, and so on.

The arrangement module 220 represents functionality incorporated by the search module 126 to arrange the plurality of search results. For example, the arrangement module 220 may employ an algorithm which utilizes a "weight" that is assigned to the search data 124(h) of FIG. 1 to order the search results. The weight may be based on a variety of factors, such as number of times a keyword appears in content described by the search data, location of the keyword in the content (e.g., text, metatag, link), and so on. Additionally, a total weight for each search result may be calculated by the arrangement module 220 based on the weights for multiple keywords which are included in the search query, such as by summing the weights which correspond to each search term included in a search query. Thus, in this instance, a relevancy of the search results to the search query, based on keywords, is utilized to order the search results, one to another. The arrangement module 220 may also incorporate a variety of other factors in order to determine how the search results are to be arranged for a particular search query, such as a relative richness of a display format which may be utilized to display the search results.

The retrieval module 222 is illustrated as including a plurality of "pluggable" modules 226(z), where "z" can be any integer from one to "Z". Each pluggable module 226(z), for instance, may be configured to obtain content from a particular content provider 102(m) for inclusion in a search result. For example, the search system 120 may be configured as a part of a content provider 102(m) and therefore have access to content 110(k) from the content provider 102(m). Accordingly, the retrieval module 222 may include a pluggable module 226(z) which is executable to obtain the content 110(k) from the content provider 102(m) for inclusion in a search result. In this way, the search result may incorporate content 110(k) obtained by the retrieval module 222 for display of a "richer" search result. For example, rather than limit the search results to a plain text output in a directory format, one or more of the search results may include pictures, complete sentences, and graphics from content which is available to the search system 120.

The pluggable modules 226(z) may also be utilized to reflect which of the plurality of content 110(k) is permitted for inclusion in a search result. For example, Internet search engines are generally limited to providing search results in a directory format (e.g., through use of a few lines of plain text) in order to comply with applicable copyrights. However, in some instances a search system 120 may be permitted to access and display content 10(k) in a search result, such as through a contractual relationship with the content owner (e.g., an agreement with a partner), common ownership (e.g., the content is owned by search system 120), and so on. Therefore, the search module 126 may include a pluggable module 226(z) which is configured to obtain "rich" content (i.e., content other than plain text) from the content provider 102(m) for inclusion in the search result.

Additionally, the plurality of pluggable modules 224(z) may be utilized to define permissible access to content by the retrieval module 222. For example, the retrieval module 222 may examine a URL contained in a search result and determine whether one of the pluggable modules 226(z) corresponds to the URL, i.e., the pluggable module is configured to obtain "rich" content from the URL. If so, the retrieval module 222 may execute the pluggable module 226(z) to obtain at least a portion of the content (e.g., a picture, a first paragraph of a news article, and so on) for display in conjunction with the search result. If not, the retrieval module 222 may provide a search result which complies with the directory format, e.g., three lines of plain text which include the keywords. Thus, by adding and/or removing pluggable modules 226(z), the search module 126 may be configured by an administrator to reflect changing content access rights.

A provider of the search system 120, for example, may sign a contract with a content provider 102(m) for access to the content 110(k). Accordingly, a pluggable module 226(z) may be added to the retrieval module 222 for obtaining the content 110(k). When the contract expires, the provider may remove the pluggable module 226(z), thereby removing access to the content 110(k). The removal of the pluggable module 226(z) may cause the retrieval module 222 to default to display of the search result in compliance with a directory format. Further discussion of pluggable modules 226(z) and content access for inclusion in a search may be found in relation to FIGS. 7 and 8.

Exemplary Procedures

The following discussion describes search and configuration techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
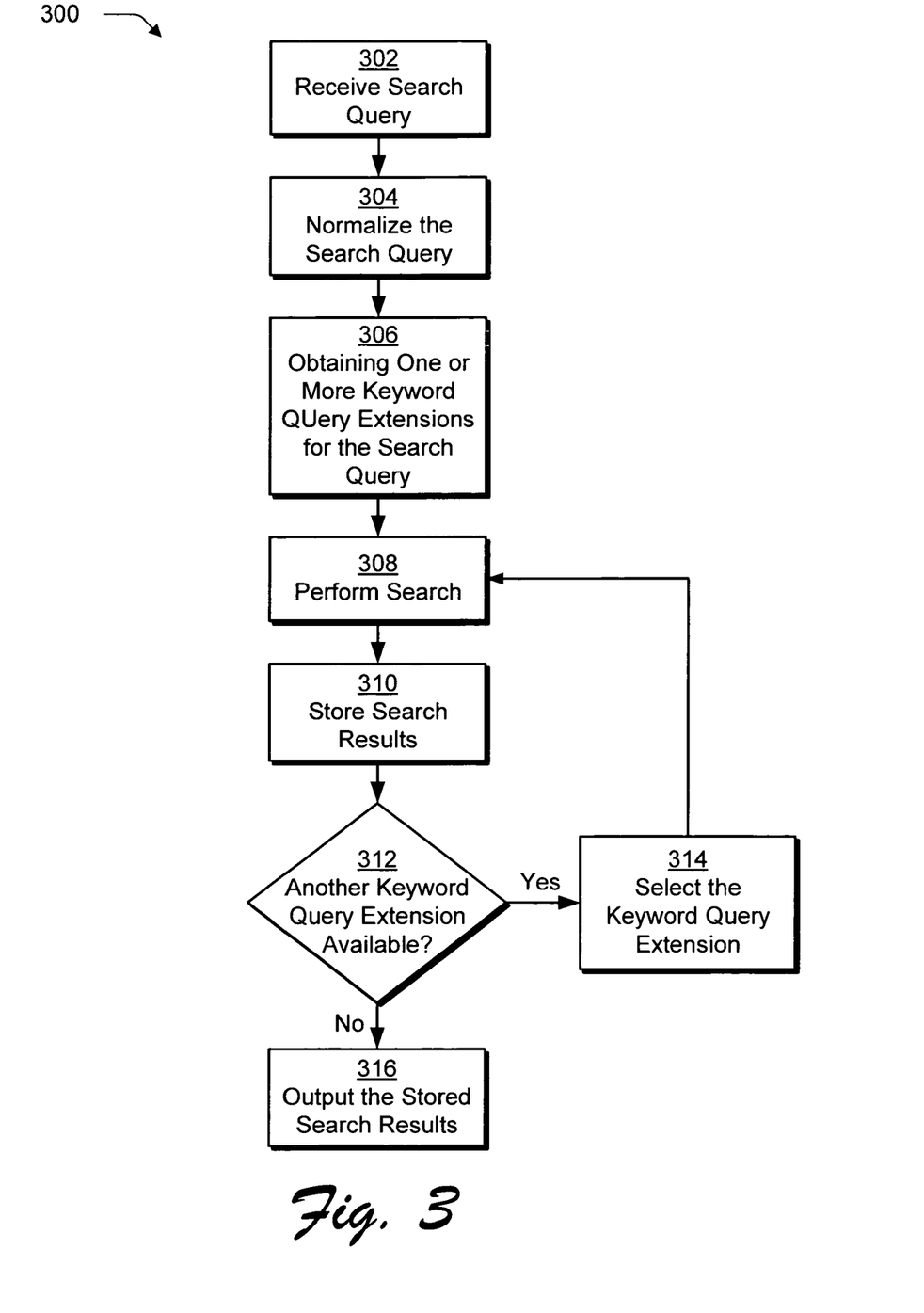
FIG. 3 is a flow diagram depicting a procedure in an exemplary implementation in which a search query is utilized to obtain one or more keywords for performing additional searches.

FIG. 3 is a flow diagram depicting a procedure 300 in an exemplary implementation in which a search query is utilized to obtain keyword query extensions for performing additional searches. A search query is received (block 302). For example, the search query may be entered via a UI and communicated from the client 104(n) to the search system 120 over the network 106. In another example, the functionality of the client 104(n) and the search system 120 are incorporated by the same device. The client 104(n), for instance, may include the search module 126 for searching local content 114(j) and therefore communication over the network 106 is not employed. In a further example, the searching of the local content 114(j) is performed through interaction with the search module 126, and therefore communication over the network 106 is employed. For instance, the search query may be utilized to search both for content 110(k) over the network 106 and content 114(j) which is stored locally on the client 104(n).

The search query is then normalized (block 304). For example, the search query may be processed to add/remove capitalization, possessives, correct tense, spelling, and so on. Other natural language processing may also be performed to normalize the search query.

One or more keyword query extensions are then obtained for the search query (block 306). The keyword query extensions may be obtained in a variety of ways. For example, the keyword query extensions may be dynamically derived through comparison of the search query with heuristic data contained in the heuristic database 128. For instance, upon receipt of a search query which contains the keywords "Arnold Schwarzenegger", the search module 126 may examine the plurality of previous search queries 224(y) to locate search queries which contain the keywords "Arnold" and/or "Schwarzenegger". These located search queries may then be examined to find additional keywords which were utilized in the previous search queries, such as "bodybuilding" and "governor". Thus, the search module 126 may leverage previous searches to determine other possible categories of interest. In this example, the one or more keyword query extensions are dynamically derived upon receipt of the search query.

In another example, the keyword query extensions may be stored before receipt of the search query. For instance, the search module 126 may periodically examine the search queries 224(y) to generate the keyword query extensions 130(g). The generated keyword query extensions 130(g) may then be stored in memory 214(x) and indexed for later retrieval. Thus, when the search query is received, the search module 126 may select one or more of the stored keyword query extensions 130(g) which correspond to the search query, such as a keyword query extension which is indexed by a keyword that is contained in the search query.

In a further example, one or more of the keyword query extensions 130(g) may correspond to preconfigured contextual categories. For instance, the search system 120 and the content provider 102(m) may be commonly owned and accessible via the same web site. Consequently, the search system 120 may give preference to the commonly owned content, such as to provide a "richer" display of search results (further discussion of which may be found in relation to FIG. 6), to promote traffic to the commonly owned content, and so on. Therefore, one or more of the keyword query extensions 130(g) may reference a domain name of the content provider to locate content within that particular domain which corresponds to the search query. Additional keyword query extensions may also reference a contextual category of content available from the content provider (such as "autos", "money", "news"), and so on. These keywords may be added to the domain name to derive additional search results for the categories, such as "<domain name> autos", "<domain name> news", and so forth.

A search is then performed (block 308) utilizing the search query. For example, a first search may be performed utilizing the search query, but not using any of the obtained keyword query extensions. The first search may be performed before, after, and/or during the obtaining of the keyword query extensions (block 306). The results of the search are stored (block 310). A determination is then made as to whether a keyword query extension is available (decision block 312). If so, the keyword query extension is selected for inclusion with the search query (block 314) and another search is performed (block 308). The results of this search are stored (block 310), and a determination is made again as to whether another keyword query extension is available (decision block 312). This portion of the procedure 300 (blocks 308-314) may be repeated for each of the obtained keywords (block 306) to perform a plurality of searches based on the search query. Continuing with the previous example, a first search may be performed for a search query (e.g., Arnold Schwarzenegger), a second search may be performed for the search query and a keyword query extension (e.g., "Arnold Schwarzenegger <domain name>"), a third search may be performed for another keyword query extension (e.g., "Arnold Schwarzenegger Politics"), and so on. Thus, the keyword query extension may provide a plurality of contextual categories for a single search query without having to employ additional post-processing functionality for processing the search results. For example, rather than perform a single search for "Arnold Schwarzenegger" and the post process the search results into a plurality of categories, the multiple searches may leverage the existing search functionality of a search system 120 to locate content and determine a relevancy of the content.

When another keyword query extension is not available (decision block 312), the stored search results are output (block 316) for display to a user. The stored search results may be output in a variety of ways, further discussion of which may be found beginning in relation to FIG. 6.

Figure 4:
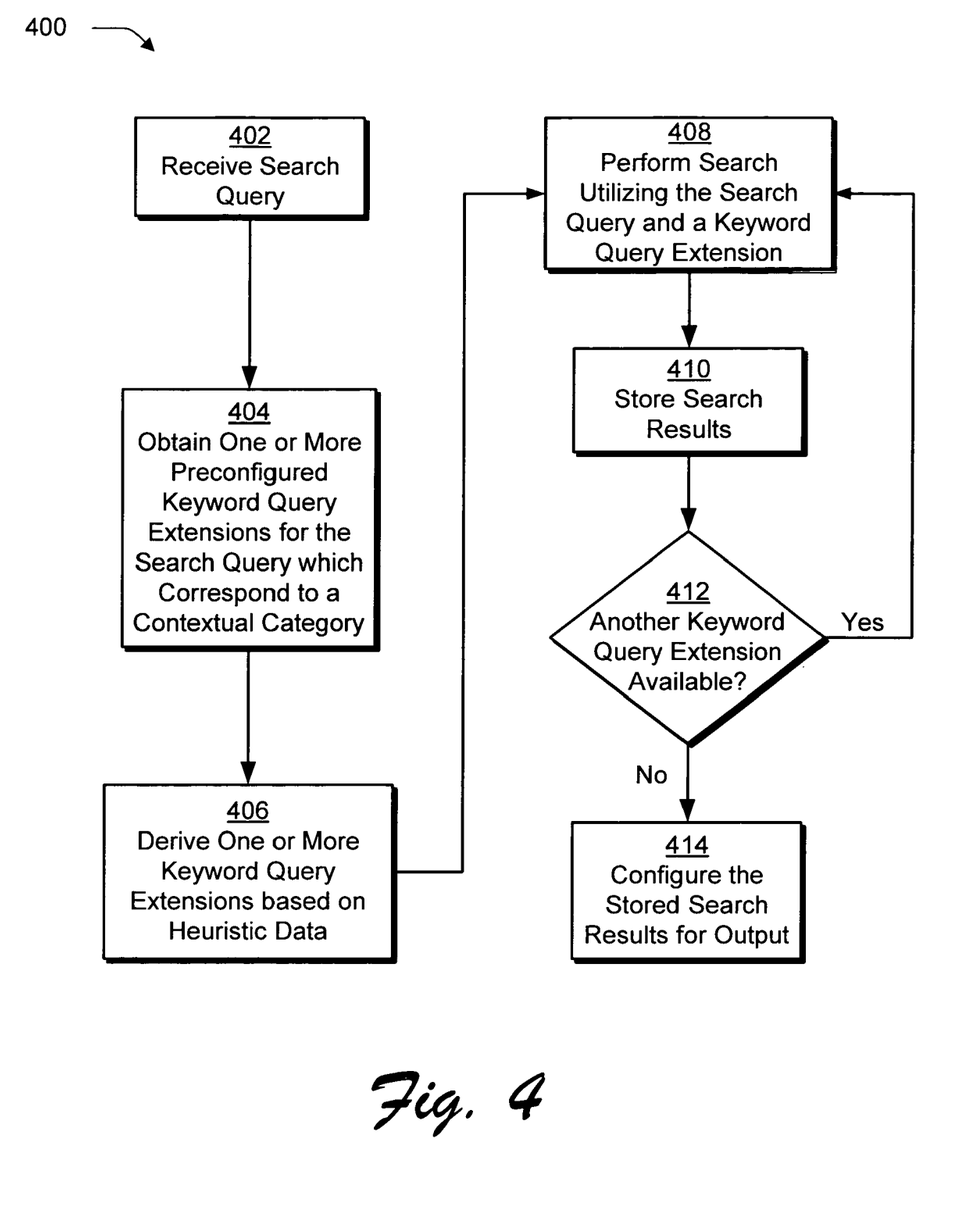
FIG. 4 is a flow diagram depicting a procedure in an exemplary implementation in which dynamically derived keywords and preconfigured keywords are utilized to perform a plurality of searches in response to a single search query.

FIG. 4 is a flow diagram depicting a procedure 400 in an exemplary implementation in which dynamically derived keyword query extensions and preconfigured keyword query extensions are utilized to perform a plurality of searches in response to a single search query. A search query is received (block 402) which contains the keywords "Labrador" and "retriever". The search query may be received in a variety of ways as previously described.

In response to the search query, one or more preconfigured keyword query extensions are obtained which provide a contextual category for the search query (block 404). For example, keyword query extensions may be configured such that a search performed utilizing that keyword query extension will correspond to a type of content, such as "news", "politics", "shopping", "entertainment", "groups", "sports", "money", "blogs", "reference", and so on.

One or more keyword query extensions may also be derived from heuristic data (block 406). For example, a user log may be maintained for a particular user which may describe past search queries received from the user. The user log may be examined to determine keywords which are commonly used by the particular user, which therefore, may be useful as a keyword query extension to locate content which may be relevant for that particular user. In another example, a plurality of user logs are examined for similar search queries to derive a commonly used keyword which may be utilized as a keyword query extension. For instance, the heuristic data may indicate that a plurality of searches which include the keywords "Labrador" and "retriever" commonly include the keyword "rescue". Thus, the "rescue" keyword may be utilized as a keyword query extension for the search query.

A variety of other techniques may also be utilized to dynamically derive a keyword query extension from heuristic data. For example, a series of queries may be utilized which share common keywords. A particular user, for instance, may first provide a search query "Labrador retriever" and then obtain search results. The particular user may then provide another search query "Labrador retriever rescue". Therefore, the search system may provide the keyword query extension "rescue" for a future search query obtained from that particular user for "Labrador retriever" based on the heuristic data. In this embodiment, it should be noted that the keyword query extensions are keywords which do not substantially match the keywords in the search query, such as by capitalizing, addition/removal of a possessive, correct spelling, correct plural form, and so on. In other words, the keyword query extension does not approximate keywords included in the search query.

A search is then performed utilizing the keyword query extensions and the search query (block 408). For example, the search query "Labrador retriever" and the keyword query extension "news" may be utilized to perform the search. The results of the search are then stored (block 410) and a determination is made as to whether another keyword query extension is available (decision block 412). In this example, another keyword query extension is available (e.g., "rescue"), which is also utilized with the search query to perform another search (block 408). Results of this other search are stored (block 410). Because no other keyword query extensions are available in this example (decision block 412), the stored search results are configured for output (block 414). For example, the stored search results may be arranged into groups according to the search performed to provide contextual categories of the search results, an example of which is shown in the following figure.

Figure 5:
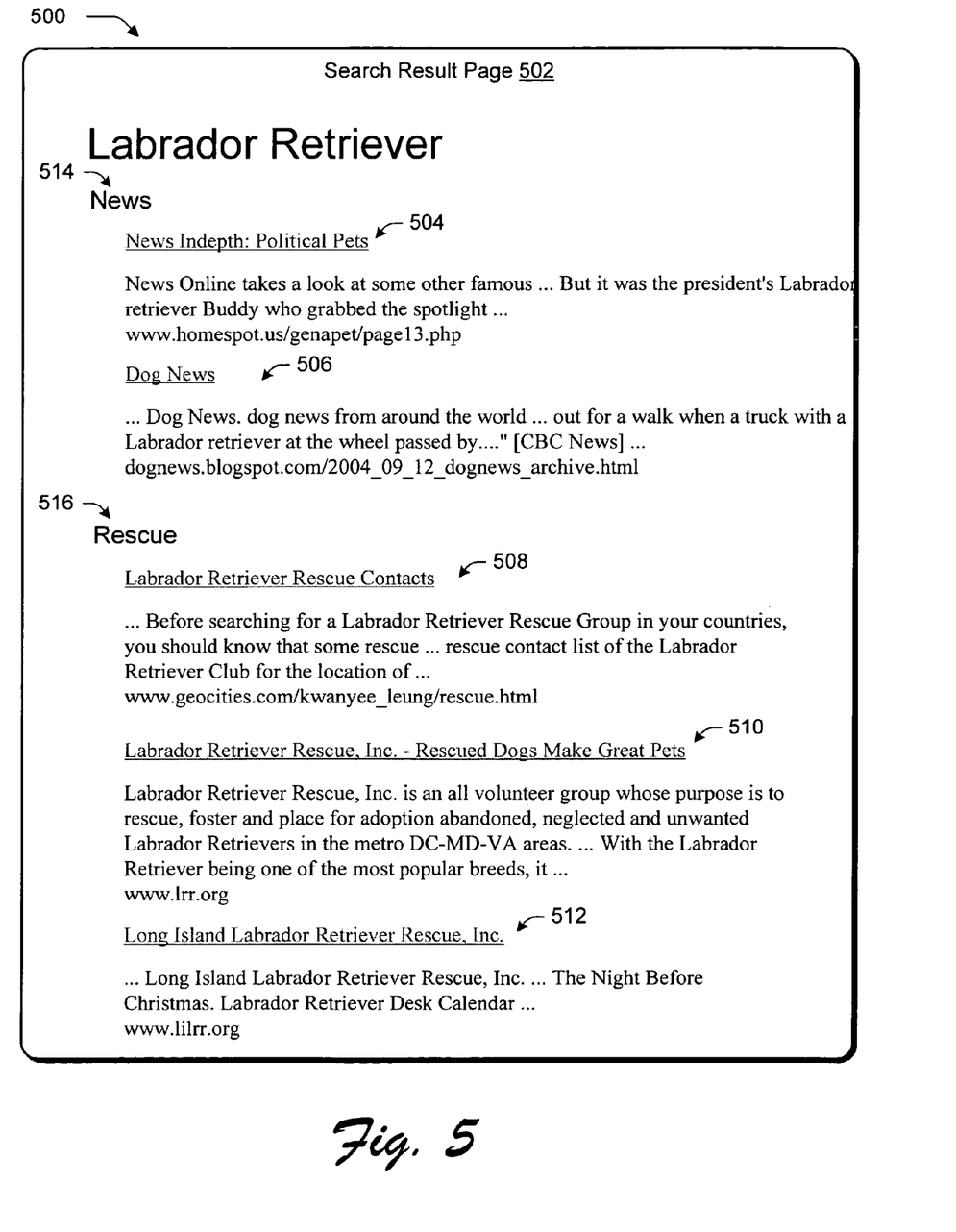
FIG. 5 is an illustration in an exemplary implementation showing a user interface having a search results page configured to display a plurality of search results obtained from the plurality of searches preformed in accordance with the procedure of FIG. 4.

FIG. 5 is an illustration in an exemplary implementation showing a user interface 500 having a search results page 502. The search results page 502 is configured to display a plurality of search results 504, 506, 508, 510, 512 obtained from the plurality of searches that were preformed in accordance with the procedure 400 of FIG. 4.

The search results 504-512 are arranged in respective groups 514, 516 based on which keyword query extension was utilized to perform the search which located the search results. For example, group 514 is illustrated as corresponding to the "news" keyword query extension. Therefore, search results 504, 506 which were obtained as a result of the search which utilized the search query "Labrador retriever" and the keyword query extension "news" are included in this group 514. Likewise, search results 508, 510, 512 which correspond to the keyword query extension "rescue" are included in group 516. Thus, the keyword query extensions (e.g., "news" and "rescue") may be utilized to provide contextual categories to the search results 504-512 such that a user, when viewing the search results 504-512, is given an additional indication as to the relative context of the various search results. The groups 514, 516 may be further leveraged to aid navigation of the user through the search results, further discussion of which may be found in relation to FIG. 9.

Figure 6:
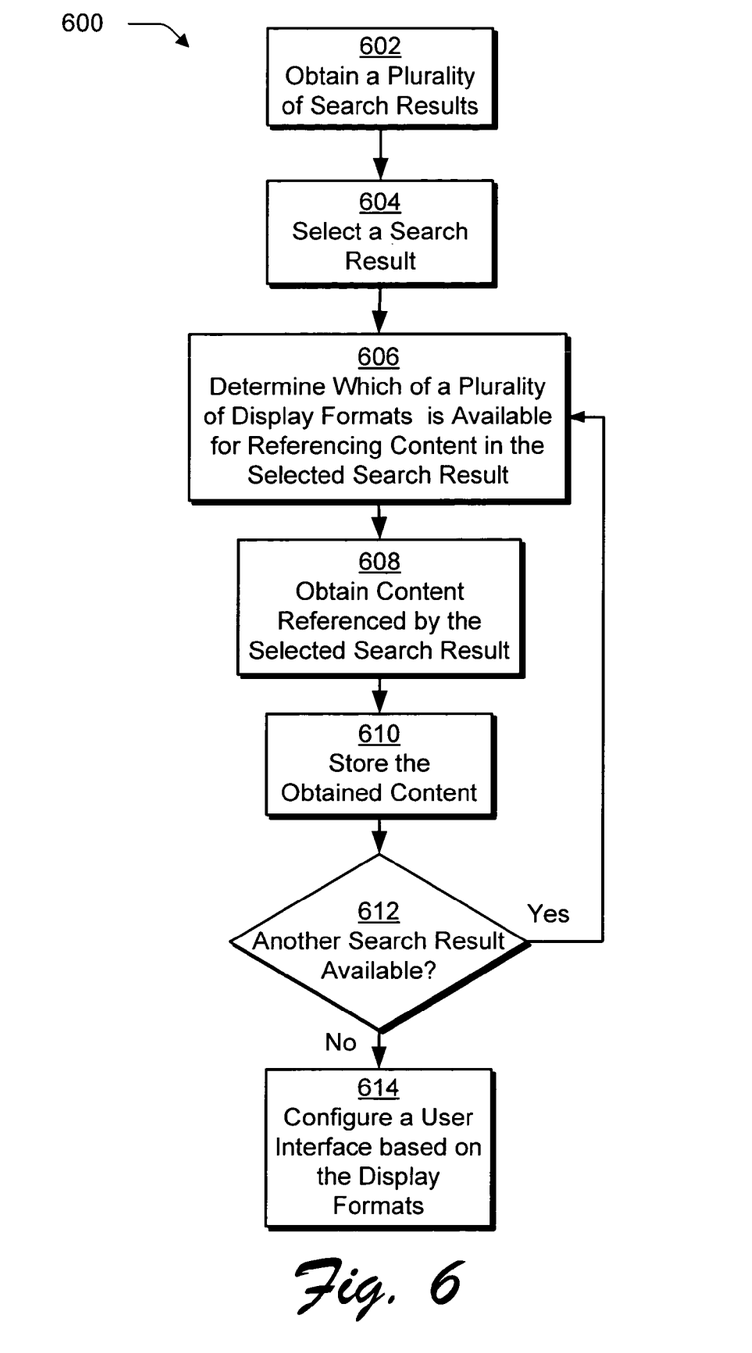
FIG. 6 is a flow diagram depicting a procedure in an exemplary implementation in which a plurality of search results are configured for display in a user interface based on a display format which is permitted for output of content in conjunction with the search results.

FIG. 6 is a flow diagram depicting a procedure 600 in an exemplary implementation in which a plurality of search results are configured for display in a user interface based on a display format which is permitted for output of content in conjunction with the search results. To provide a "richer" display of search results that is more appealing to the user, the search system 120 may leverage access to content in order to include a portion of the content 110(k) in the search result. Thus, the user may view a user interface which includes content which is more "rich" than a plain text directory format. For example, a plurality of search results are obtained (block 602), such as through the searches performed as described in relation to FIGS. 3 and 4.

A search result from the plurality of search results is selected (block 604). A determination is then made as to which of a plurality of display formats is available for describing content in the selected search result (block 606). For example, the plurality of search results may be obtained from the search system 120 of FIG. 1 configured as an Internet search engine. The search system may then compare a URL contained in each search result and determine, from the URL, whether the search system is permitted to obtain "rich" content from the URL for inclusion in the search result. For instance, the search system may have a list of permissible URLs and compare URLs in the search result with URLs in the list. If there is a match, the search system is permitted to obtain data from the URL for inclusion in the search result. A variety of other techniques may also be utilized, another example of which may be found in relation to FIG. 8.

Content which is referenced by the selected search result is then obtained (block 608). For example, a search result may reference an article having a picture. Therefore, the picture and a portion of the article may be obtained by the search system 120 and stored (block 610). A determination is then made as to whether another search result is available (decision block 612). If so, a determination is again made as to which of a plurality of display formats is available for referencing content in the select search result (block 606). Although this procedure 600 describes that this determination continues (decision block 612) for each search result, a threshold may be employed to limit the amount of time used to perform the determination. For example, the determination may be terminated when a predetermined number of "rich" content items are obtained, when an amount of "rich" content that may be displayed in the user interface at any one time is obtained, and so on.

Once another search result is not available (decision block 612), a user interface is configured based on the display formats (block 614). The user interface may be configured in a variety of ways, an example of which is shown in the following figure.

Figure 7:
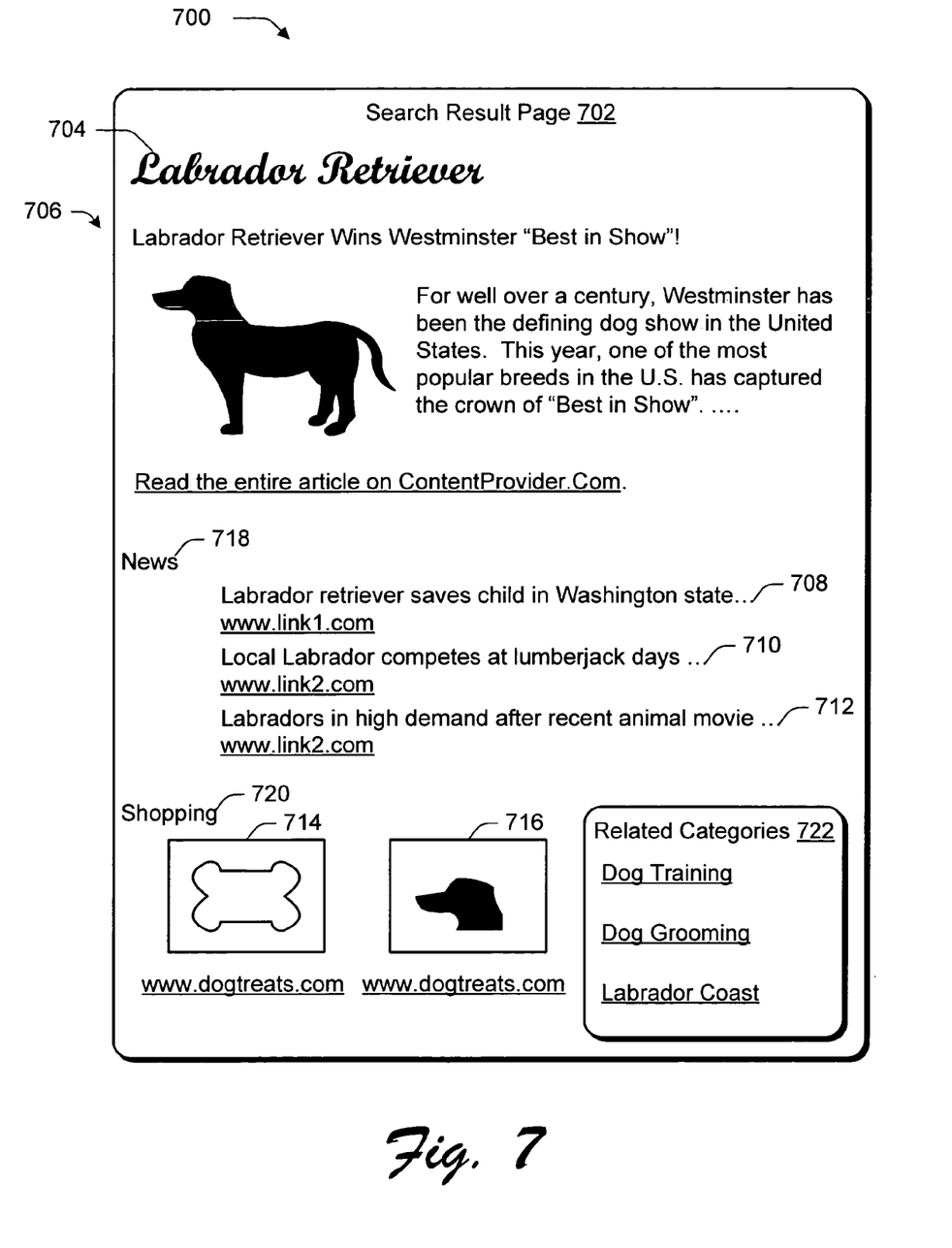
FIG. 7 is an illustration in an exemplary implementation in which a user interface is shown which includes a search result page having a plurality of search results which are arranged based on a relative "richness" of the search result.

FIG. 7 is an illustration in an exemplary implementation in which a user interface 700 is shown which includes a search result page 702 having a plurality of search results which are arranged based on a relative "richness" of the search result. The illustrated search result page 702 corresponds to a search performed for the search query "Labrador retriever" 704. The search result page 702 includes a plurality of search results 706, 708, 710, 712, 714, 716.

The plurality of search results 706-716 are arranged at least in part based on a relative "richness" of a display format which may be utilized to display the respective results. For example, search result 706 includes an illustration of a dog and a portion of an article included in content referenced by the search result 706. Search results 708-712, however, does not have accessible rich content, and are thus displayed in a directory format in a corresponding contextual group 718 which is illustrated as "news".

Search results 714, 716 in group 720 are also illustrated as having "rich" content, which in this instance is illustrated as logos obtained from retailers. For example, the retailers may enter into an agreement with a provider of the search system 120 to include a portion of content referenced by the search results. Thus, a potential consumer, upon receipt of the search result, may be more likely to navigate to the content referenced by the search results 714, 716.

The user interface 700 also includes a display of related categories 722. These categories may correspond to additional keyword query extensions that may be of interest to the user. For example, in response the search query for "Labrador retriever", the search system 120 may obtain the keyword query extensions of "news" and "shopping" as previously described. However, additional keyword query extensions may also be obtained which are not immediately utilized to perform additional searches. Rather, these keyword query extensions may be provided as links in the related categories 722. Therefore, when one of the links is selected, the search system 120 may perform a search which corresponds to the category, such as "dog training", "dog grooming", and "Labrador coast". Further discussion of navigation through search results may be found in relation to FIG. 9.

It should be noted that in the illustrated implementation of the user interface 700 of FIG. 7, even though the relative richness of the display format has been utilized to order the search results, the ordering is not based solely on display format. For example, even though the search results 708-712 in the "news" group 718 are displayable as plain text, these results may be considered as "more relevant" to the search query than the search results 714, 716 in the "shopping" group 720. Consequently, the search results 708-712 in the news group 718 are arranged for display to the user before the search results 714, 716 in the shopping group 720. Thus, the display format may be one of a variety of factors which may be utilized to configure the user interface 700.

Figure 8:
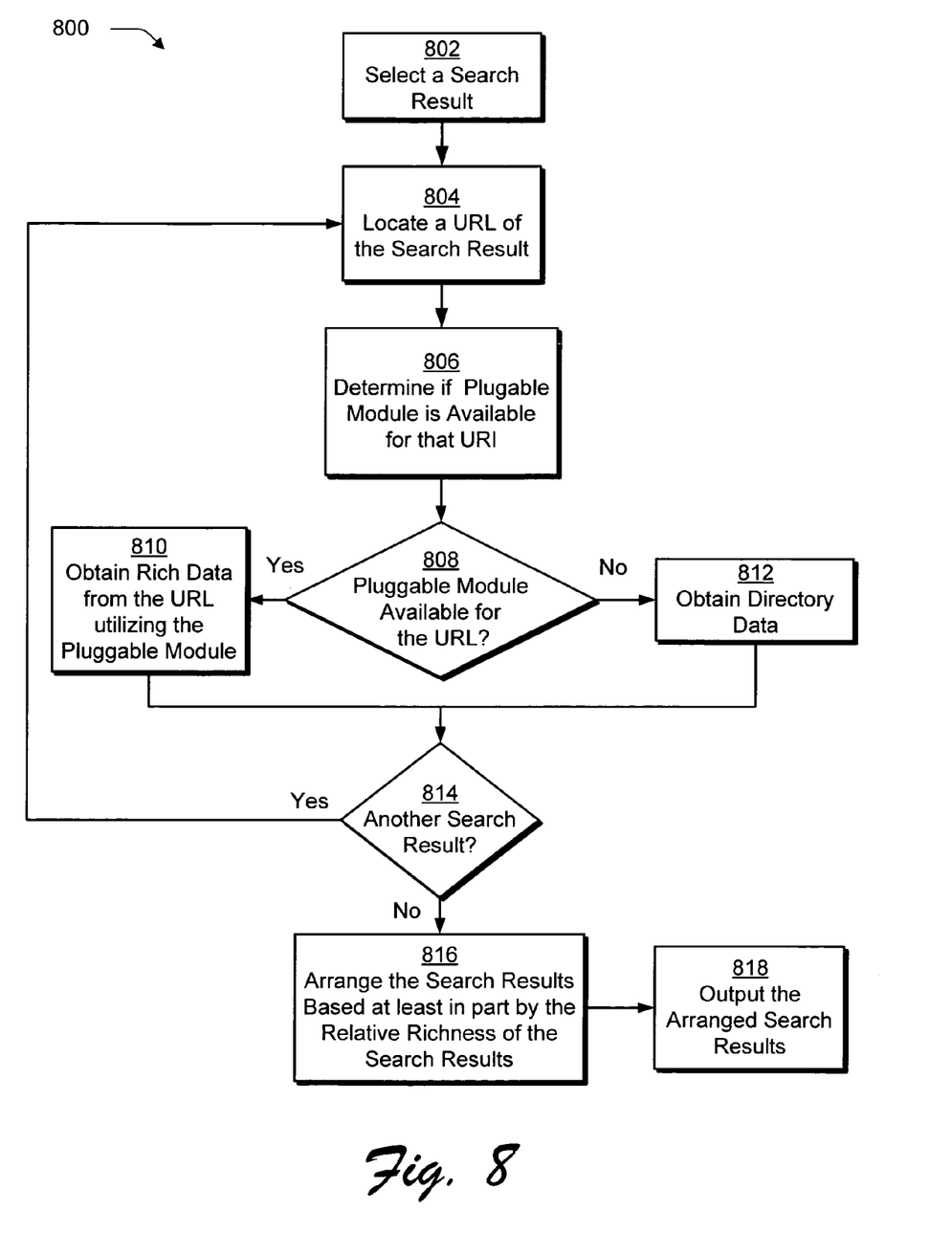
FIG. 8 is a flow diagram depicting a procedure in an exemplary implementation in which pluggable modules are utilized to obtain rich content for display in conjunction with a search result in a user interface.

FIG. 8 is a flow diagram depicting a procedure 800 in an exemplary implementation in which pluggable modules are utilized to obtain rich content for display in conjunction with a search result in a user interface. As previously described in relation to FIG. 2, a retrieval module 222 may include a plurality of pluggable modules 226(z), each of which is configured to retrieve a portion of content from a particular content provider. The pluggable modules may be configured in a variety of ways, such as to reflect current conditional rights of the search system 120 to obtain content from the content providers 102(m), which content is also owned by a provider of the search system 120, and so on. Thus, the existence of the pluggable module 226(z) in the retrieval module 222 may be utilized by the search system to determine whether access to content is permitted, and is so, retrieve the content.

A search result is selected (block 802) from a plurality of search results, such as the search results obtained from the procedures 300, 400 of FIGS. 3 and 4. A URL of the search result is located (block 804). A determination is then made as to whether a pluggable module is available for that URL (block 806). For example, each of the pluggable modules 226(z) may be identified by a URL, for which, the pluggable module is configured to retrieve content.

If a pluggable module is available for the URL (decision block 808), rich data is obtained from the URL utilizing the pluggable module (block 810). For example, the pluggable module, when executed, may retrieve content from the referenced URL, such as a web page. The pluggable module may then select a first graphic (e.g., a picture) included in the web page and a first paragraph of text included in the web page. Thus, the pluggable module may obtain content having a display format which is "richer" than a plain text directory format utilized if such a pluggable module is not available. For example, if the pluggable module is not available for the URL (decision block 808), "directory" data may be obtained for configuring the search result to comply with the directory format. A determination is then made as to whether another search result is available (decision block 814). If so, this portion of the procedure 800 may be repeated (blocks 804-814) until another search result is not available. For example, if a pluggable module is not available (decision bock 808), directory data may be obtained (block 812), such as plain text for arrangement in a directory format.

Once data for inclusion of the search results has been obtained, the search results are arranged based at least in part by the relative richness of the search results (block 816). As previously described, relative richness of a respective display format may be one of a variety of factors which are utilized to arrange the search results for output in a user interface. For example, two search results may each reference an article having matching textual elements, one to another, such as a news article describing the same event. However, one of the articles may be configured for output in plain text, while the other article may have a rich display format that includes pictures and rich text formatting. Therefore, the other article may be give priority in the arrangement of the search results over the plain text article, even though both articles contain the same textual descriptions. In this way, the user which originated the search query is provided with an output of the arranged search results (block 818) that has an improved "look and feel", thereby improving the user's experience with the search system.

Figure 9:
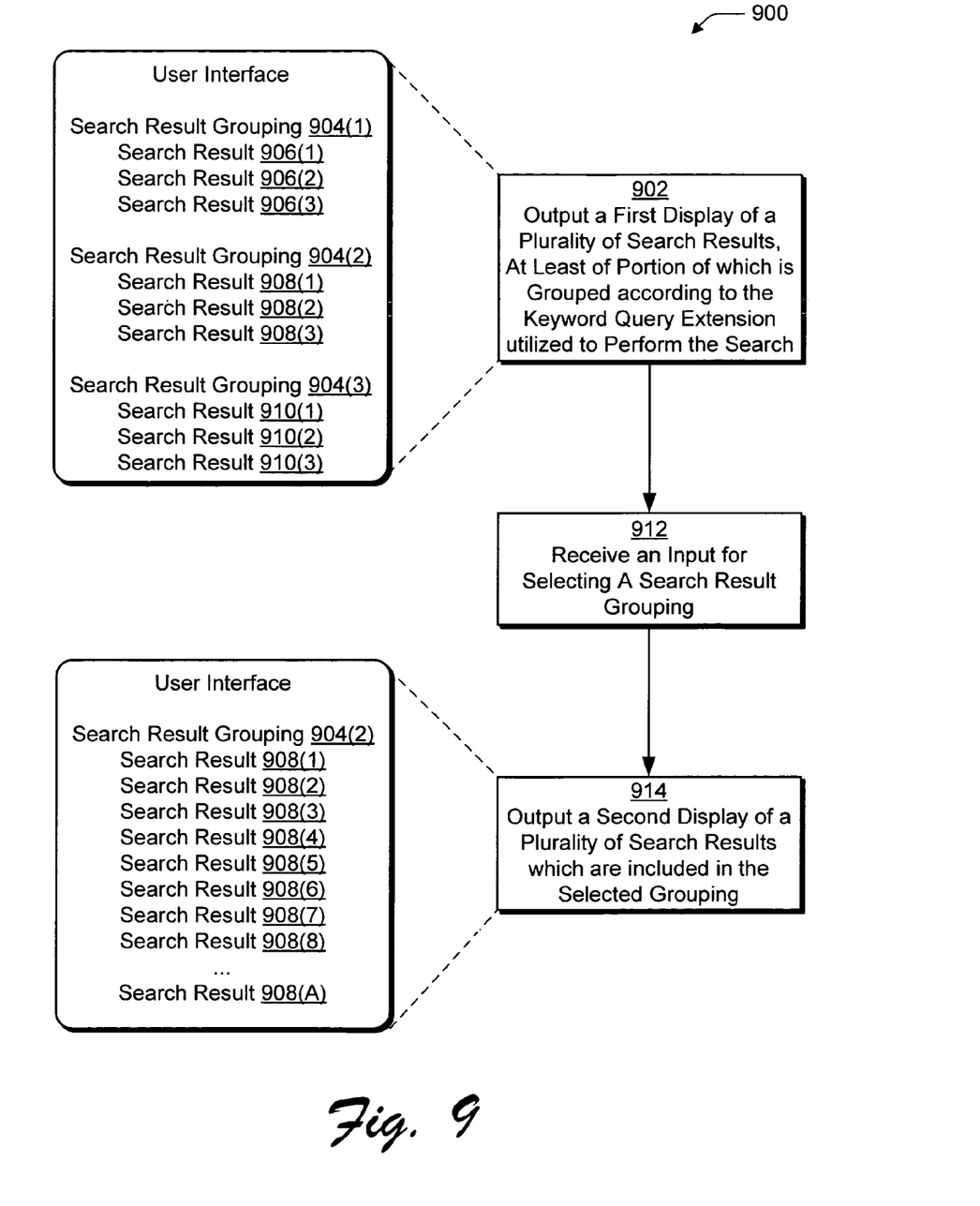
FIG. 9 is a flow diagram depicting a procedure in an exemplary implementation in which navigation through search results is performed through use of context categories provided by grouping a plurality of search results.

FIG. 9 is a flow diagram depicting a procedure 900 in an exemplary implementation in which navigation through search results is performed through use of contextual categories provided by grouping a plurality of search results. A first display of a plurality of search results is output, at least of portion of which is grouped according to the keyword query extension utilized to perform the search (block 902). For example, a user interface may include a plurality of search results groupings 904(1), 904(2), 904(3). Each of search results grouping includes a respective plurality of search results 906(1)-906(3), 908(1)-908(3), 910(1)-910(3) which were obtained by a respective keyword query extension utilized to perform the search.

An input is received for selecting a search result grouping (block 912). For example, a user may utilize an input device (e.g., a mouse, a keyboard, a remote control, and so on) to select one of the search results 908(1)-908(3). In another example, the user may select the display of the search results grouping 904(2). Referring again briefly to FIG. 7, for instance, a user may select news 718 or shopping 720 which are displayed to reference the contextual category, in which, the respective search results are included.

In response to the received input, a second display of a plurality of search results is output that are included in the selected grouping (block 914). For example, upon selection of the search result grouping 904(2), the user interface may be reconfigured to display additional search results 908(4)-908 (A) which are contained in that grouping. Thus, the user is able to navigate from a display of a plurality of search results arranged by contextual category to "drill down" to a particular contextual category of interest. In other words, the first display provides a "horizontal" view which includes a plurality of categories which is "pivoted" to a "vertical" view of search results that are contained in that category. Such navigation may continue through the search results to provide additional functionality to the user. For example, referring again to FIG. 7, the user may provide the search query "Labrador retriever" and obtain a plurality of search results 708-716 arranged into corresponding groups 718, 720. The user may then select one of the groups (e.g., news 718), which causes additional search results that correspond to that group to be displayed. For instance, the selection may cause a new search to be performed using the search query and the keyword query extension "news" 718. In another instance, the selection may retrieve stored search results from the performance of the search which provided the search results 708-712. Thus, the user is not required to manually enter an additional search having the keywords "Labrador retriever news", but rather may select a representation in a user interface which causes the search results to be output automatically and with minimal user interaction.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    in response to a received search query, selecting a plurality of keyword query extensions based on heuristic data which describes a plurality of previously performed searches;
    generating a plurality of search queries, each generated search query comprising the received search query and a particular one of the plurality of keyword query extensions;
    performing a plurality of searches utilizing the plurality of generated search queries to locate content; and
    in response to the received search query, returning results from each of the plurality of searches performed utilizing the plurality of generated search queries, wherein returning results from each of the plurality of searches performed utilizing the plurality of generated search queries comprises:
        concurrently displaying results obtained from a first of the plurality of generated search queries and results obtained from a second of the plurality of generated search queries, wherein the results obtained from the first of the plurality of generated search queries are grouped separately from the results obtained from the second of the plurality of generated search queries.

2. A method as described in claim 1, wherein:
    the heuristic data is formed from user logs which describe a plurality of previous search queries; and
    each of the plurality of previous search queries used to select the plurality of keyword query extensions match at least a portion of the search query.

3. A method as described in claim 1, further comprising:
    receiving user-selection of a particular search result obtained from the first of the plurality of generated search queries and displayed in a user interface (UI); and
    reconfiguring the UI to display an additional search result which was obtained from the first of the plurality of generated search queries, but not previously displayed in the UI.

4. A method as described in claim 1, wherein returning the results from each of the plurality of searches performed utilizing the generate search queries further comprises:
    determining a richness of a display format for each of the results returned from each of the plurality of searches, relative one to another; and
    ordering the results returned from each of the plurality of searches, one to another, for output to a user interface based at least in part on the determined relative richness.

* * * * *